United States Patent [19]

Tobias et al.

[11] 4,360,606

[45] * Nov. 23, 1982

[54] PHOTO-DEGRADABLE POLYMER COMPOSITIONS

[75] Inventors: John W. Tobias, East Lansing; Lynn J. Taylor, Haslett, both of Mich.

[73] Assignee: Owens-Illinois, Inc., Toledo, Ohio

[ * ] Notice: The portion of the term of this patent subsequent to Mar. 19, 1991, has been disclaimed.

[21] Appl. No.: 776,693

[22] Filed: Mar. 11, 1977

Related U.S. Application Data

[63] Continuation of Ser. No. 301,199, Oct. 26, 1972, abandoned.

[51] Int. Cl.³ ............................ C08K 5/17; C08K 5/08; C08K 5/07
[52] U.S. Cl. ............................ 523/124; 523/125; 523/128; 106/186; 106/187
[58] Field of Search ............... 525/938; 526/914; 106/171, 174, 186, 187; 260/DIG. 43, 23 XA, 23 A, 45.7 R, 45.9 R, 45.9 SR, 45.95 G; 204/159.18, 159.19, 159.2; 523/124, 125

[56] References Cited

U.S. PATENT DOCUMENTS

| | | | |
|---|---|---|---|
| 3,143,536 | 8/1964 | Guzzetta et al. | 260/DIG. 43 |
| 3,341,357 | 9/1967 | Felid | 260/DIG. 43 |
| 3,592,792 | 7/1971 | Newland et al. | 260/41 |
| 3,673,134 | 6/1972 | Anderson | 260/5 |
| 3,676,401 | 7/1972 | Henry | 260/23 R |
| 3,759,807 | 9/1973 | Osborn et al. | 260/DIG. 43 |
| 3,767,638 | 10/1973 | Johnson | 260/DIG. 43 |
| 3,797,690 | 3/1974 | Taylor et al. | 260/DIG. 43 |
| 3,846,395 | 11/1974 | Harper et al. | 260/DIG. 43 |
| 3,880,952 | 4/1975 | Brackman | 260/DIG. 43 |
| 3,888,804 | 6/1975 | Swanholm et al. | 260/DIG. 43 |
| 3,944,511 | 3/1976 | Taylor | 260/23 H |
| 3,992,349 | 11/1976 | Sparks | 260/DIG. 43 |
| 4,038,228 | 7/1977 | Taylor | 260/23 |
| 4,048,410 | 9/1977 | Taylor et al. | 260/DIG. 43 |
| 4,056,499 | 11/1977 | Taylor | 260/DIG. 43 |
| 4,067,836 | 1/1978 | Potts | 260/23 H |
| 4,094,756 | 6/1978 | Taylor | 204/159.2 |
| 4,101,720 | 7/1978 | Taylor et al. | 260/DIG. 43 |

*Primary Examiner*—Veronica P. Hoke
*Attorney, Agent, or Firm*—Charles S. Lynch; Myron E. Click; David H. Wilson

[57] ABSTRACT

There is disclosed a photoreactive plastic composition degradable by ultraviolet radiation, the composition comprising an organic polymeric material having dispersed therein a degradation controlling amount of an additive system consisting essentially of at least one organic photosensitizer and at least one readily autoxidizable organic substance.

45 Claims, No Drawings

PHOTO-DEGRADABLE POLYMER COMPOSITIONS

This is a continuation, of application Ser. No. 301,199 filed Oct. 26, 1972, now abandoned.

BACKGROUND OF THE INVENTION

This invention relates to plastic compositions containing a photosensitizer which renders the composition degradable by ultraviolet radiation.

The advent of plastics has given rise to improved methods of packaging goods. For example, polyethylene and polypropylene plastic films, bags, bottles, styrofoam cups and blister packages have the advantages of being chemically resistant, relatively unbreakable, light in weight and translucent or transparent. The increasing use of plastics in packaging applications has created a serious waste disposal problem. Burning of these plastic materials is expensive and may add to air pollution problems.

Unlike some other packaging materials, such as paper and cardboard, plastics are not readily destroyed by the elements of nature. Thus, burying them is not an effective means of disposal and can be expensive.

Plastics are biologically recent developments, and hence are not easily degradable by micro-organisms which attack most other forms of organic matter and return them to the biological life cycle. It has been estimated that it may take millions of years for organisms to evolve which are capable of performing this function. In the meantime, plastic containers and packaging films are beginning to litter the countryside after being discarded by careless individuals.

One means suggested for combating the plastic waste disposal problem has been the use of plastic compositions which degrade upon exposure to ultraviolet light. This approach would take advantage of the natural tendency of most organic polymers to undergo gradual reaction with atmospheric oxygen, particularly in the presence of light. Typically, a photosensitizing additive is employed in order to accentuate this natural tendency. The photosensitizing additive absorbs ultraviolet light (e.g., from sunlight); the additive, in the resulting photo-excited state, undergoes a chemical reaction which leads to the generation of free radicals which initiate an autoxidation process thereby leading to the eventual disintegration of the plastic material.

According to the understanding of the state of the art, sensitized photo-oxidative degradation processes involve the photochemical generation of free-radical intermediates, followed by subsequent reactions which are essentially thermal (i.e., nonphotochemical). The photosensitizing additive increases the rate of formation of free radicals, but does not appreciably alter the rates of subsequent reactions of those radicals. Consequently, the rate of the overall process, which may be quite rapid initially, can decrease drastically if the sensitizer is consumed during the reaction, or if the source of light is removed.

The present invention provides further control of the rate of sensitized photodegradation through the use of a second type of additive, referred to hereinafter as a "readily autoxidizable organic substance", in addition to the photosensitizing additive.

The primary function of this "readily autoxidizable" substance is to accelerate those "thermal" autoxidation steps which follow the initial photochemical initiation step; the presence of the readily autoxidizable substance may also increase the rate or efficiency of photochemical initiation.

DESCRIPTION OF THE INVENTION

In accordance with this invention, a degradable plastic composition is prepared by the admixture of an organic polymeric material and a degradation-controlling additive system, the system consisting essentially of at least one organic photosensitizer and at least one readily autoxidizable organic substance.

Typical organic polymeric materials contemplated include organic polymers (and copolymers) especially polyethylene, polypropylene, poly(1-butene), poly(4-methyl-1-pentene), ethylenepropylene copolymers, ethylene-1-butene copolymers, ethylene-1-hexene copolymers, ethylene-vinyl acetate copolymers, ethyleneethyl acrylate copolymers, ethylene-acrylic acid copolymers and their salts, polystyrene, polyvinyl chloride, poly(vinylidene chloride), polyvinyl fluoride, poly(vinylidene fluoride), polyoxymethylene, poly(ethylene oxide), poly(propylene oxide), polyvinyl alcohol, polyvinyl acetate, polyvinyl formal, polyvinyl butyral, poly(methyl acrylate), poly(ethyl acrylate), poly(-caprolactam), poly(hexamethyleneadipamide), poly(ethylene terephthalate), vinyl chloride-vinyl acetate copolymers, acrylonitrile polymers and copolymers, methacrylonitrile polymers and copolymers, cellulose acetate, cellulose propionate, cellulose acetate butyrate, ethyl cellulose, methyl cellulose, hydroxyethyl cellulose, and hydroxypropyl cellulose. Preferred polymers include polyethylene, polypropylene, poly(4-methyl-1-pentene), polystyrene and polyvinylchloride.

The phrase "organic photosensitizer", as used herein, may be defined as an organic substance which absorbs ultraviolet or visible light, and which upon photo-excitation is capable of initiating a chemical reaction such as photo-oxidation, photopolymerization, photo-isomerization, etc.

Suitable organic photosensitizers include ketones such as acetophenone, acetoin, 1'-acetonaphthone, 2'-acetonaphthone, anisoin, anthrone, bianthrone, benzil, benzoin, benzoin methyl ether, benzoin isopropyl ether, 1-decalone, 2-decalone, benzophenone, p-chlorobenzophenone, di benzalacetone, benzoylacetone, benzylacetone, deoxybenzoin, 2,4-dimethylbenzophenone, 2,5-dimethylbenzophenone, 3,4-dimethylbenzophenone, 4-benzoylbiphenyl, butyrophenone, 9-fluorenone, 4,4-bis-(dimethylamino)-benzophenone, 4-dimethylaminobenzophenone, dibenzyl ketone, 4-methylbenzophenone, propiophenone, benzanthrone, 1-tetralone, 2-tetralone, valerophenone, 4-nitrobenzophenone, di-n-hexyl ketone, isophorone, chalcone, 4,4'-oxydibenzophenone, xanthone; quinones such as anthraquinone, 1-aminoanthraquinone, 2-amino-anthraquinone, 1-chloroanthraquinone, 2-chloroanthraquinone, 1-methyl-anthraquinone, 2-methylanthraquinone, 2-ethylanthraquinone, 2-tertbutylanthraquinone, 1-nitroanthraquinone, 2-phenylanthraquinone, 1,2-naphthoquinone, 1,4-naphthoquinone, 2-methyl-1,4-naphthoquinone, 1,2-benzanthraquinone, 2,3-benzanthraquinone, and phenanthrenequinone; nitro compounds such as nitrobenzene, p-nitroanisole, 4-nitrobiphenyl, and p-nitroaniline; organic sulfur compounds such as diphenyl disulfide, dibenzyl disulfide, dibenzoyl disulfide, tetramethylthiuram monosulfide, tetramethylthiuram disulfide, 2-mercaptobenzothiazole, and p-toluenesulfinic acid; halogenated organic compounds, such as chlorinated paraffins, chlorinated biphenyls and polyphenyls, chlorinated toluenes, chlorinated xylenes, benzal chloride, benzhydryl chloride, chlorinated naphthalenes, tetrachlorotetrahydrononaphthalene, phenacyl chloride, phenacyl bromide, and styrene dibromide; aromatic amines such as diphenylamine, triphenylamine, and N-phenyl-betanaphthylamine; organic peroxides and hydroperoxides such as tert-butyl hydroperoxide, cumene hydroperoxide, p-menthanehydroperoxide, tert-butylperoxybenzoate, dicumylperoxide, and 2,5-dimethyl-2,5-bis(tert-butylperoxy)hexane; and azo compounds such as azobisisobutyronitrile, azodicarbonamide, dimethyl-2-azobisisobutyrate, and azobenzene.

Organic dyes may also be employed as photosensitizers. Typical examples include Acridine Orange, Acridine Yellow, Alizarin, Azure B, Brilliant Green, Bromthymol Blue, Chlorazole Black E, Congo Red, Crystal Violet, N,N-Dimethyl-p-phenylazoaniline, Eosin Y, Fluorescein, Indigo, Malachite Green, Martius Yellow, Methylene Blue, Methylene Violet, Methyl Orange, Methyl Red, Orange II, Pararosaniline, Rhodamine B, Rose Bengal, and Solvent Violet 9.

The phrase "readily autoxidizable organic substance", as used herein, may be defined as a substance which reacts with gaseous oxygen at a reaction rate more rapid than the corresponding reaction, under comparable conditions, of gaseous oxygen with an equal weight of the additive-free polymer into which the "readily autoxidizable substance" is to be combined. Such reaction rates may be compared by the volumetric measurement of the rate of absorption of gaseous oxygen by separate pure samples of the autoxidizable substance and the polymer, under conditions of constant temperature and pressure.

Specific examples of such readily oxidizable organic substances include the following:

Olefinic Materials 1-octadecene; 1-hexadecene; 1-docosene; isobutylene trimer and tetramer; dicyclopentadiene; myrcene; ocimene; farnesene; phellandrene; lycopene; squalene; digeranyl; carotenes; limonene; $\alpha$-pinene; $\beta$-pinene.

Ethers, Acetals, Ketals, etc.

Dibenzyl ether; bis($\alpha$-methylbenzyl ether); p-allylanisole; polyethylene glycol and derivatives; polypropylene glycol and derivatives; poly(tetrahydrofuran) and derivatives; $\alpha$-amyl cinnamaldehyde dimethyl acetal; citral dimethyl acetal; dihydrosafrole; hydratropic aldehyde dimethyl acetal; isosafrole; methyl eugenol; safrole; phenylacetaldehyde diethyl acetal; 2,2-diallyloxypropane; pentaerythritol diformal; p-dibenzyloxybenzene; 1,1,2,2-tetra allyloxy ethane; 1,1,3,3-tetra allyloxy propane.

Amines

Oleylamine; n-decylamine; linoleylamine; spermine.

Substituted Aromatic Hydrocarbons

Indene and substituted indenes; tetralin and derivatives; fluorene and substituted fluorenes; 9,9'-bifluorene; bibenzyl; 1,2-dihydronaphthalene, 1,3,5-triisopropylbenzene; 1,2,4,5-tetraisopropylbenzene; 9,10-dihydroanthracene; diphenylmethane; phenylcyclohexane; xanthene; n-dodecylbenzene; alkyl naphthalenes; allyl benzene; divinylbenzene; methallylbenzene; cumene; allyl and methallyl derivatives of naphthalene, anthracene, etc.

Aldehydes

Heliotropin; 3-benzyloxybenzaldehyde; 4-benzyloxybenzaldehyde; p-n-octyloxybenzaldehyde; decanal; 10-undecenal; dodecanal; 2-methylundecanal; n-tetradecanal; $\alpha$-amylcinnamaldehyde; cinnamaldehyde; citral; citronellal; p-isopropylbenzaldehyde; p-isopropyl-alpha-methylhydrocinnamaldehyde; $\alpha$-n-hexylcinnamaldehyde; salicyladehyde.

Natural Oils

Castor oil; fish oil; linseed oil; tall oil; soya oil; tung oil; safflower oil; oiticica oil.

Unsaturated Fatty Acids

Oleic Acid; linoleic acid; linolenic acid; eleostearic acid; ricinoleic acid; erucic acid; arachidonic acid.

Esters of Unsaturated Fatty Acids

Butyl oleate; monoolein; diolein; triolein; polyethylene glycol mono-oleate; polyethylene glycol dioleate; methyl linoleate; methyl linolenate.

Natural and Synthetic Resins

Rosin; limed rosin; ester gum; rosin acids; rosin esters; terpene resins; coumarone-indene resins; alkyd resins; dicyclopentadiene-derived resins; furan resins; polymers and copolymers of butadiene; polymers and copolymers of isoprene; unsaturated polyester resins and unsaturated waxes such as carnauba wax and candelilla wax.

The following organic compounds may also be considered "readily autoxidizable organic materials" within the scope of the present invention:

Abietic acid and esters derived therefrom; farnesol and esters derived therefrom; geraniol and esters derived therefrom; linalool and esters derived therefrom; citronellol and esters derived therefrom; benzyl alcohol and esters derived therefrom; triallyl orthoformate.

The use of natural products and their derivatives, such as unsaturated fatty acids, esters of unsaturated fatty acids, and natural oils, as readily autoxidizable organic substances is particularly advantageous. The use of such materials minimizes such problems as toxicity, food contamination, and possible release of the substances, or their oxidation products, to the environment following waste disposal. Furthermore, the biodegradability of such substances will facilitate the attack of soil microorganisms on discarded plastic films and articles.

The novel plastic compositions of this invention are prepared by a number of methods. A preferred method consists essentially of heating the polymer at a temperature below its decomposition temperature, incorporating the photosensitizer and autoxidizable substance, and mixing the ingredients so as to obtain a substantially uniform mixture. The mixture can then be molded and cooled to form a solid molded article. In the alternative, the mixture can be extruded and cooled to form a solid extrudate. Conventional plastic processing equipment can be used for melting the polymer, mixing the polymer with the photosensitizer and autoxidizable substance(s) and molding or extruding the resulting mixture. Processing conditions, such as temperature, time, and pressure, will be obvious to those skilled in the art.

Another preferred process for preparing the novel plastic compositions of this invention consists essentially of blending the photosensitizer and autoxidizable substance with a solid polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additives. The resulting melt can be extruded or molded and cooled to form a solid extrudate or molded article.

A preferred process for preparing the novel plastic compositions of this invention consists essentially of casting a film from a composition of the photosensitizer, autoxidizable substance, and polymer in an inert solvent or dispersant. By "inert solvent" is meant that the solvent does not react with the polymer, photosensitizer, or autoxidizable substance. Use of this method is particularly atractive for preparing degradable coating or adhesive materials.

The photosensitizer and/or autoxidizable substance can also be applied as a solution, slurry, or paste to the surface of a plastic article. Such surface application can comprise brushing, roller coating, spraying, dipping or printing (i.e., uniformly or image-wise) on the surface of the article, in the presence or absence of a solvent.

The novel plastic compositions of this invention can be prepared at the time of disposal of conventional plastic articles. For example, a plastic article can be crushed, milled or ground, and subsequently or simultaneously mixed with the photosensitizer and autoxidizable substance.

The novel degradable plastic compositions can also contain non-reactive additives. By the term "non-reactive additive(s)" is meant a chemical additive, filler, or reinforcement commonly used in the formulation of plastic compositions which does not materially interfere with the degradation process. For example, the compositions of this invention can contain processing aids, viscosity depressants, mold-release agents, emulsifiers, slip agents, anti-static agents, and fibrous reinforcements which do not materially detract from the eventual degradation of the composition. The compositions of this invention can also contain fillers, such as barium sulphate, calcium carbonate, calcium silicate, fumed colloidal silica, glass, and clay.

Flame retardants, lubricants, colorants, plasticizers, adhesion promoters and stabilizers, such as those used to prevent thermo-oxidative decomposition can also be used. In some cases, it may be necessary to add an anti-oxidant or stabilizer to permit high temperature processing, even though such additive may slow the degradation process. In other cases, it may be desirable to retard degradation for a limited period of time.

It is contemplated that the degradable plastic compositions of this invention will ordinarily contain about 0.01 to 10% of the organic photosensitizer, about 0.10 to 50% of the readily autoxidizable organic substance, and about 50 to 99.9% of the organic polymer. The quantities of any non-reactive additives should not be included in calculating such percentages.

In one highly preferred embodiment of the present invention, a mixture of an organic polymer, organic photosensitizer and readily autoxidizable organic substance is prepared and shaped by conventional means. The resulting film, sheet, fiber, tube, or molded article is then exposed to an artificial source of ultraviolet radiation, such as a mercury-vapor lamp. The function of this exposure is to initiate a gradual chemical degradation process and/or to convert the degradable polymeric composition to a more readily degradable material by the selective introduction of functional groups, such as hydroperoxide groups, which are capable of promoting further oxidative and/or photo-oxidative degradation processes. This exposure to an artificial source of ultraviolet radiation can be carried out immediately after fabrication of plastic bodies, or it may be conducted as part of a waste treatment process.

The following example represents one of the best embodiments contemplated by the inventors.

EXAMPLE

A polyethylene film containing 1 wt.% 4,4'-oxydibenzophenone and 10 wt.% linoleic acid was prepared by casting from xylene solution onto a heated glass substrate. The resulting film, of thickness ca. 0.003 inch, was subjected to ultraviolet irradiation from a 32-watt circular source emitting principally at a wavelength of 305 millimicrons. After irradiation in air for a period of 24 hours, the film was examined by infrared spectrophotometry; substantial peaks in the hydroxyl and carbonyl regions of the infrared spectrum indicated that extensive photo-oxidative degradation had taken place. A control experiment utilizing a polyethylene film containing 1% oxydibenzophenone but no linoleic acid, showed that the omission of linoleic acid caused a pronounced decrease in the susceptibility of the polymer composition to photo-oxidative degradation.

We claim:

1. As a composition of matter, a polymeric material containing a degradation-controlling amount of an additive system consisting essentially of at least one photosensitive aliphatic or aromatic ketone and at least one readily autoxidizable olefinic compound, said olefinic compound being an amine having at least one olefinic group.

2. The composition of claim 1 wherein said amine is selected from the group consisting of oleylamine and linoleylamine.

3. As a composition of matter, a polymeric material containing a degradation-controlling amount of an additive system consisting essentially of at least one photosensitive aliphatic or aromatic ketone and at least one readily autoxidizable olefinic compound, said readily autoxidizable olefinic compound being an olefinic ether.

4. The composition of claim 3 wherein said olefinic ether is selected from the group consisting of p-allylanisole, methyl eugenol, 2,2-diallyloxypropane, 1,1,2,2-tetra allyloxyethane and 1,1,3,3-tetra allyloxy propane.

5. As a composition of matter, a polymeric material containing a degradation-controlling amount of an additive system consisting essentially of at least one photosensitive aliphatic or aromatic ketone and at least one readily autoxidizable olefinic compound, said readily autoxidizable olefinic compound being an olefinic acetal.

6. The composition of claim 5 wherein said olefinic acetal is selected from the group consisting of α-amyl cinnamaldehyde dimethyl acetal and citral dimethyl acetal.

7. As a composition of matter a polymeric material containing a degradation-controlling amount of an additive system consisting essentially of at least one photosensitive aliphatic or aromatic ketone and at least one readily autoxidizable olefinic compound, said readily autoxidizable olefinic compound being an olefinic formal.

8. The composition of claim 7 wherein said olefinic formal is selected from the group consisting of isosafrole and safrole.

9. As a composition of matter, a polymeric material containing a degradation-controlling amount of an additive system consisting essentially of at least one photosensitive aliphatic or aromatic ketone and at least one readily autoxidizable olefinic compound, said readily autoxidizable olefinic compound being an olefinic alcohol.

10. The composition of claim 9 wherein said olefinic alcohol is selected from the group consisting of farnesol, geraniol, linalool and citronellol.

11. As a composition of matter, a polymeric material containing a degradation-controlling amount of an additive system comprising at least one photosensitive aliphatic or aromatic ketone and at least one readily autoxidizable olefinic compound selected from the group consisting of olefinic amines and olefinic aldehydes.

12. The composition of claim 11 wherein said olefinic amine is selected from the group consisting of oleylamine and linoleylamine.

13. The composition of claim 11 wherein said olefinic aldehyde is selected from the group consisting of 10-undecenal, α-amylcinnaldehyde, cinnamaldehyde, citral, citronellal, and α-n-hexylcinnamaldehyde.

14. As a composition of matter, a polymeric material containing a degradation-controlling amount of an additive system consisting essentially of photosensitive acetophenone and readily autoxidizable oleylamine.

15. A process for preparing a degradable polymeric composition which comprises incorporating into a polymeric material an additive system consisting essentially of at least one photosensitive aliphatic or aromatic ketone and at least one readily autoxidizable olefinic compound, said olefinic compound being an amine having at least one olefinic group.

16. The process of claim 15 wherein said amine is selected from the group consisting of oleylamine and linoleylamine.

17. A process for preparing a degradable polymeric composition which comprises incorporating into a polymeric material an additive system consisting essentially of at least one photosensitive aliphatic or aromatic ketone and at least one readily autoxidizable olefinic compound, said readily autoxidizable olefinic compound being an olefinic ether.

18. The process of claim 17 wherein said olefinic ether is selected from the group consisting of p-allylanisole, methyl eugenol, 2,2-diallyloxypropane, 1,1,2,2-tetra allyloxy ethane and 1,1,3,3-tetra allyloxy propane.

19. A process for preparing a degradable polymeric composition which comprises incorporating into a polymeric material an additive system consisting essentially of at least one photosensitive aliphatic or aromatic ketone and at least one readily autoxidizable olefinic compound, said readily autoxidizable olefinic compound being an olefinic acetal.

20. The process of claim 19 wherein said olefinic acetal is selected from the group consisting of α-amyl cinnamaldehyde dimethyl acetal and citral dimethyl acetal.

21. A process for preparing a degradable polymeric composition which comprises incorporating into a polymeric material an additive system consisting essentially of at least one photosensitive aliphatic or aromatic ketone and at least one readily autoxidizable olefinic compound, said readily autoxidizable olefinic compound being an olefinic formal.

22. The process of claim 21 wherein said olefinic formal is selected from the group consisting of isosafrole and safrole.

23. A process for preparing a degradable polymeric composition which comprises incorporating into a polymeric material an additive system consisting essentially of at least one photosensitive aliphatic or aromatic ketone and at least one readily autoxidizable olefinic compound, said readily autoxidizable olefinic compound being an olefinic alcohol.

24. The process of claim 23 wherein said olefinic alcohol is selected from the group consisting of farnesol, geraniol, linalool and citronellol.

25. A process for preparing a degradable polymeric composition which comprises incorporating into a polymeric material an additive system comprising at least one photosensitive aliphatic or aromatic ketone and at least one readily autoxidizable olefinic compound selected from the group consisting of olefinic amines and olefinic aldehydes.

26. The process of claim 25 wherein said olefinic amine is selected from the group consisting of oleylamine and linoleylamine.

27. The process of claim 25 wherein said olefinic aldehyde is selected from the group consisting of 10-undecenal, α-amylcinnamaldehyde, cinnamaldehyde, citral, citronellal, and α-n-hexylcinnamaldehyde.

28. A process for preparing a degradable polymeric composition which comprises incorporating into a polymeric material an additive system consisting essentially of photosensitive acetophenone and readily autoxidizable oleylamine.

29. As an article of manufacture, a plastic body comprising an organic polymeric material having incorporated therein a degradation-controlling amount of an additive system consisting essentially of at least one photosensitive aliphatic or aromatic ketone and at least one readily autoxidizable olefinic compound, said olefinic compound being an amine having at least one olefinic group.

30. The article of manufacture of claim 29 wherein said amine is selected from the group consisting of oleylamine and linoleylamine.

31. As an article of manufacture, a plastic body comprising an organic polymeric material having incorporated therein a degradation-controlling amount of an additive system consisting essentially of at least one photosensitive aliphatic or aromatic ketone and at least one readily autoxidizable olefinic compound, said readily autoxidizable olefinic compound being an olefinic ether.

32. The article of manufacture of claim 31 wherein said olefinic ether is selected from the group consisting of p-allylanisole, methyl eugenol, 2,2-diallyloxypropane, 1,1,2,2-tetra allyloxy ethane and 1,1,3,3-tetra allyloxy propane.

33. As an article of manufacture, a plastic body comprising an organic polymeric material having incorporated therein a degradation-controlling amount of an additive system consisting essentially of at least one photosensitive aliphatic or aromatic ketone and at least one readily autoxidizable olefinic compound, said readily autoxidizable olefinic compound being an olefinic acetal.

34. The article of manufacture of claim 33 wherein said olefinic acetal is selected from the group consisting of α-amyl cinnamaldehyde dimethyl acetal and citral dimethyl acetal.

35. As an article of manufacture, a plastic body comprising an organic polymeric material having incorporated therein a degradation-controlling amount of an additive system consisting essentially of at least one photosensitive aliphatic or aromatic ketone and at least one readily autoxidizable olefinic compound, said readily autoxidizable olefinic compound being an olefinic formal.

36. The article of manufacture of claim 35 wherein said olefinic formal is selected from the group consisting of isosafrole and safrole.

37. As an article of manufacture, a plastic body comprising an organic polymeric material having incorporated therein a degradation-controlling amount of an additive system consisting essentially of at least one photosensitive aliphatic or aromatic ketone and at least one readily autoxidizable olefinic compound, said readily autoxidizable olefinic compound being an olefinic alcohol.

38. The article of manufacture of claim 37 wherein said olefinic alcohol is selected from the group consisting of farnesol, geraniol, linalool and citronellol.

39. As an article of manufacture, a plastic body comprising an organic polymeric material having incorporated therein a degradation-controlling amount of an additive system comprising at least one photosensitive aliphatic or aromatic ketone and at least one readily autoxidizable olefinic compound selected from the group consisting of olefinic amines and olefinic aldehydes.

40. The article of manufacture of claim 39 wherein said olefinic amine is selected from the group consisting of oleylamine and linoleylamine.

41. The article of manufacture of claim 39 wherein said olefinic aldehyde is selected from the group consisting of 10-undecenal, α-amylcinnamaldehyde, cinnamaldehyde, citral, citronellal, and α-n-hexylcinnamaldehyde.

42. As an article of manufacture, a plastic body comprising an organic polymeric material having incorporated therein a degradation-controlling amount of an additive system consisting essentially of photosensitive acetophenone and readily autoxidizable oleylamine.

43. The article of manufacture of claim 42 wherein the body is a container.

44. The article of manufacture of claim 42 wherein the body is a film.

45. The article of manufacture of claim 42 wherein the body is a fiber.

* * * * *